S. C. MENIER.
FLOATING ELECTRIC TROLLEYWAY AND A FLOATING PASSENGER CAR.
APPLICATION FILED APR. 26, 1915.
1,159,519.
Patented Nov. 9, 1915.
3 SHEETS—SHEET 2.
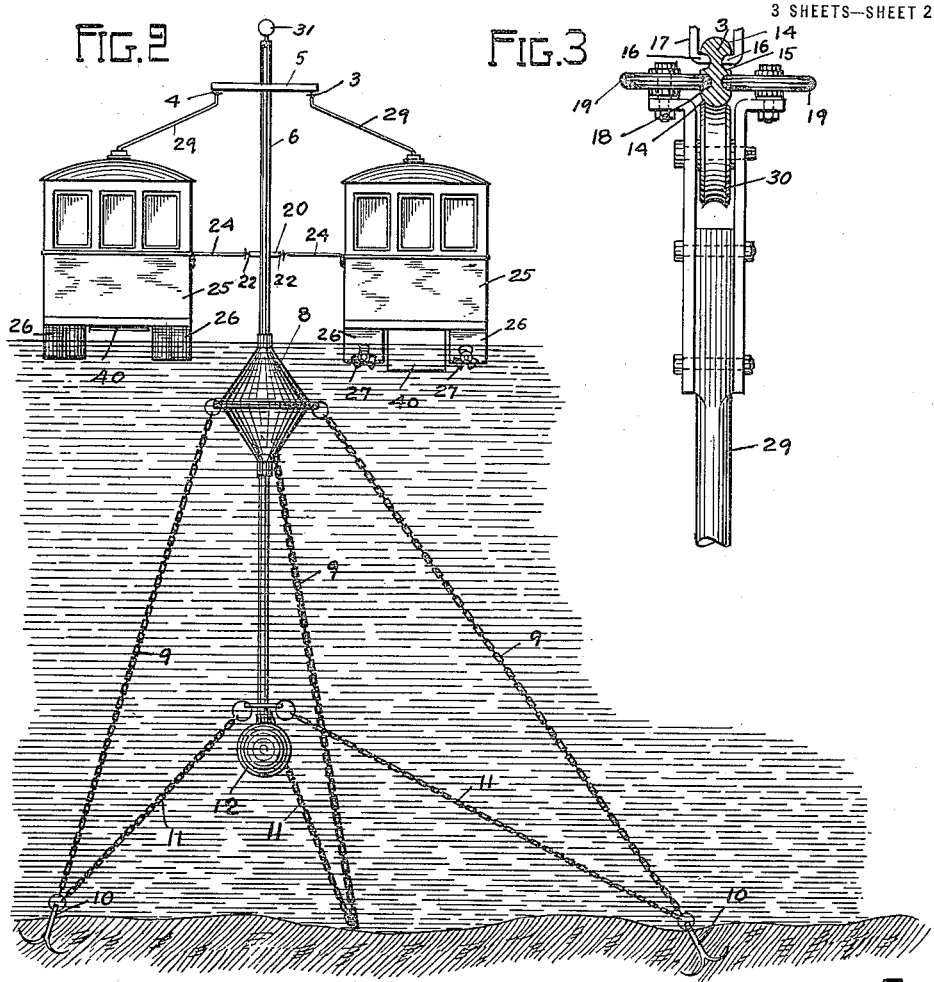
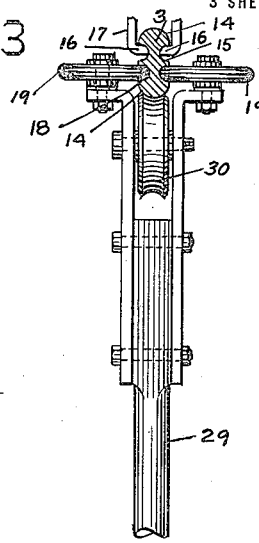
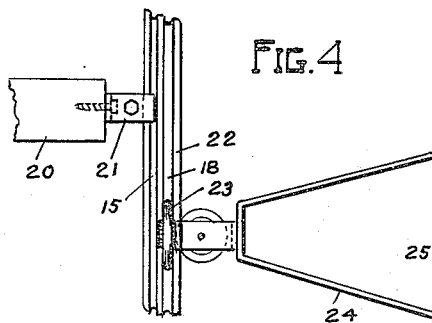
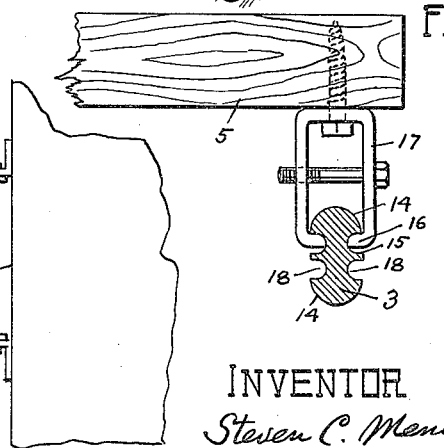
WITNESSES
INVENTOR
Steven C. Menier
By Marcus S. Leve
His Attorney S. C. MENIER.
FLOATING ELECTRIC TROLLEYWAY AND A FLOATING PASSENGER CAR.
APPLICATION FILED APR. 26, 1915.
1,159,519.
Patented Nov. 9, 1915.
3 SHEETS—SHEET 3.
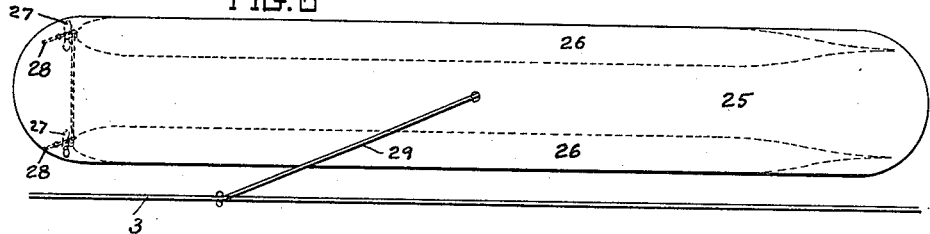
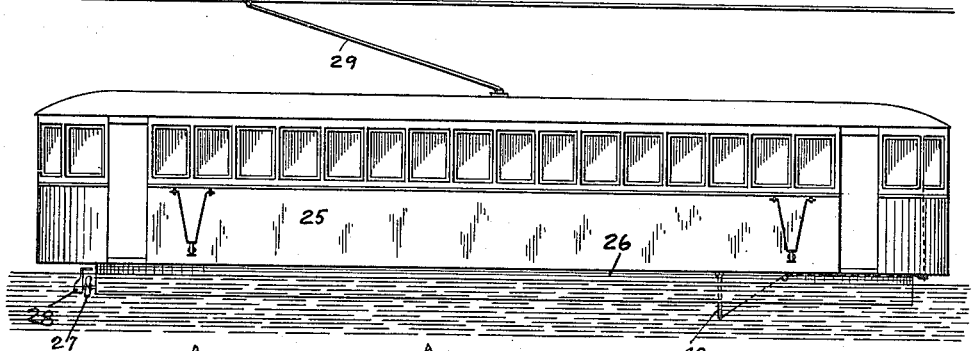
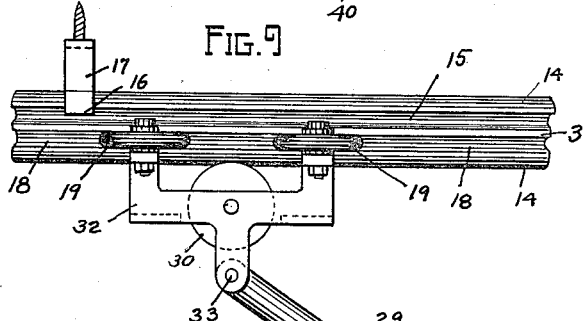
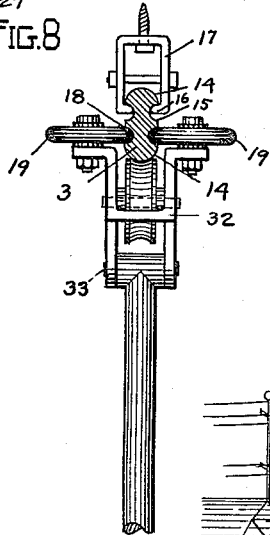
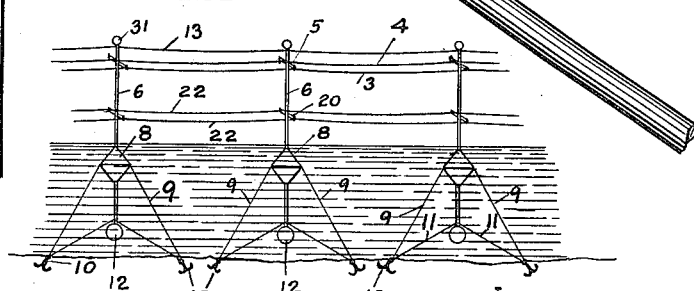
WITNESSES
INVENTOR
Steven C. Menier
By Marcus S. Leve
His Attorney.

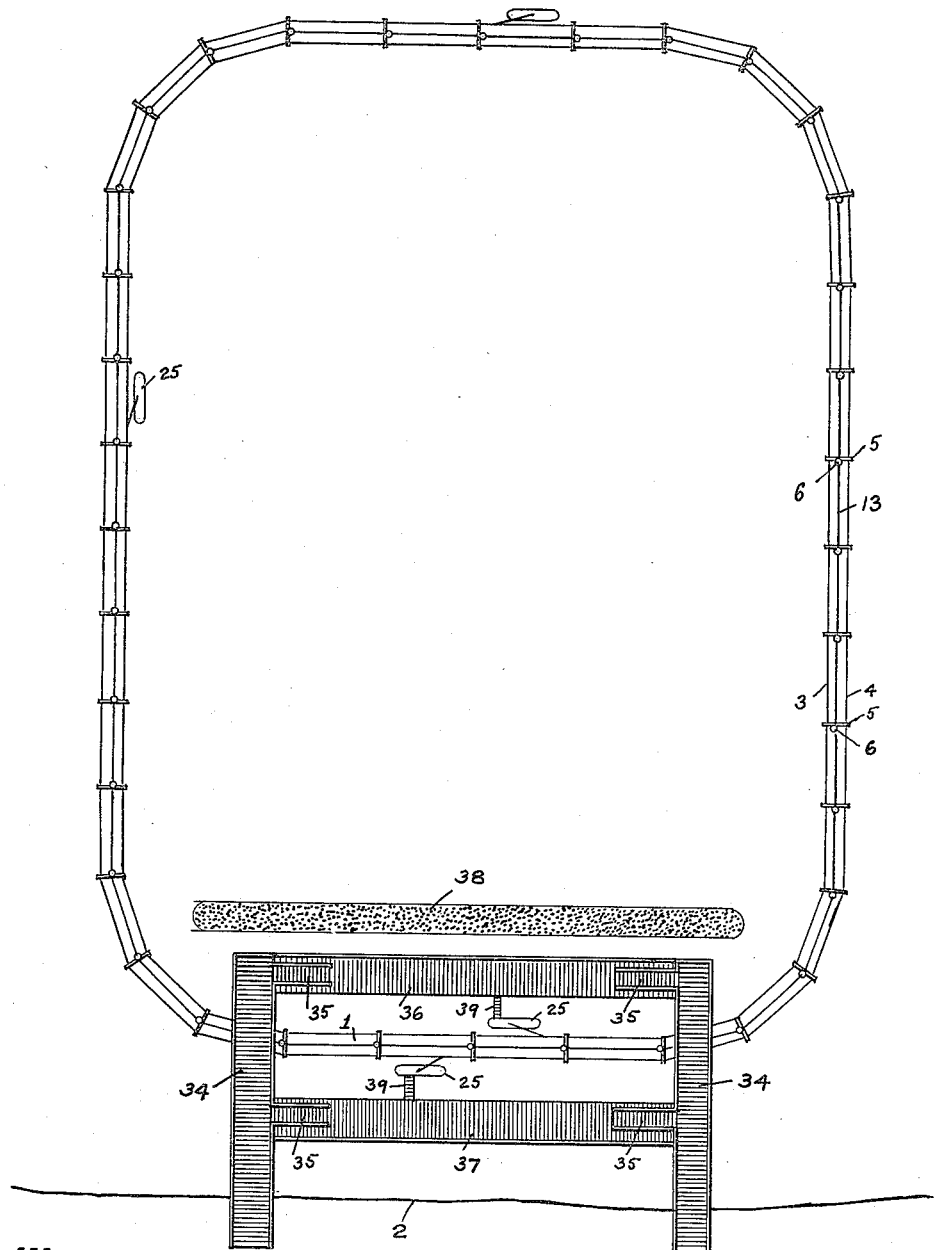

UNITED STATES PATENT OFFICE.

STEVEN C. MENIER, OF SAN FRANCISCO, CALIFORNIA.

FLOATING ELECTRIC TROLLEYWAY AND A FLOATING PASSENGER-CAR.

1,159,519. Specification of Letters Patent. Patented Nov. 9, 1915.

Application filed April 26, 1915. Serial No. 24,178.

*To all whom it may concern:*

Be it known that I, STEVEN C. MENIER, a citizen of the United States, residing in the city and county of San Francisco, State of California, have invented a new and useful Floating Electric Trolleyway and a Floating Passenger-Car, of which the following is a specification.

My invention relates to improvements in floating electric trolleyways and floating passenger cars to be used at sea shore recreation resorts or sea shore bathing places or the like, for recreation purposes and consists in suspending overhead a single or double line of electric conductors from cross beams carried by a number of floating upright posts anchored at the bottom of the sea near the shore, and in carrying the terminals of said conductors to a source of electric current.

It further consists of a number of car bodies furnished with seats for passengers placed upon proper floats and provided with propellers driven by electric motors receiving electric current from the said overhead conductors through electric trolley poles carried on top of the cars and having trolley wheels running in contact with the said conductors.

It further embraces means for guiding the said floating cars along the course of the trolley way, means for illuminating the cars and the entire course of said trolley way, means for providing a convenient landing place for taking on or letting off passengers and other features of construction as fully set forth hereinafter, and illustrated in the accompanying drawings which form part hereof.

Figure 1 of the drawings is a plan view of a floating trolleyway, drawn to a small scale, showing the arrangement of the landing place. Fig. 2 is an end view looking in the direction of the trolleyway, showing one of the anchored floating trolley posts carrying two overhead electric conductors and two cars, connected by means of trolley poles to the said overhead conductors. Fig. 3 is an enlarged detail of the end of the trolley pole showing the trolley contact wheels engaging the overhead conductor. Fig. 4 is an enlarged detail showing a guiding arm carried at the side of a car engaging the guiding trolley rail. Fig. 5 is an enlarged detail showing the manner of securing the overhead conductors to the cross beams on the floating trolley posts. Fig. 6 is a plan view of a floating electric car. Fig. 7 is a side elevation of the same car. Figs. 8 and 9 are an end view and a side elevation of a modification of the end of the trolley pole showing a carriage provided with four contact trolley wheels engaging an overhead conductor, the said carriage being pivoted to the end of the trolley pole, and Fig. 10 is a perspective view of a portion of the trolley way showing three anchored floating trolley posts carrying the two overhead conductors, the two guiding trolley rails and the tie cable connecting the trolley posts at the top.

In Fig. 1 the trolley way is shown to be of a rectangular shape, the side 1 of said rectangle is running along the shore line 2 for a greater or less distance where a landing place is built. At the two ends of the side 1 the trolley way takes a curved direction and may be made to run therefrom over any desired course, the said two ends being at last brought together to form an endless track.

The trolleyway is formed of one or two electric conductors 3 and 4 which are suspended from cross beams 5 carried by the upright posts 6 which are anchored at short intervals all along the course of the track.

The upright posts 6 are best shown in Fig. 2. They are made up of the straight poles 6 carrying at about their middle buoyant bodies 8 which are secured rigidly to them, and which are anchored down to the sea bottom by means of the chains 9 secured to the anchors 10. At their lower ends the poles 6 are fastened by means of the chains 11 to the same anchors 10 or they may be secured instead to any other anchors. Weights 12 may be secured to the bottoms of the poles 6 in order to assist in keeping them in an upright position. It is best to anchor the buoyant bodies 8 at such a depth as to cause them to remain entirely submerged at low tide. The floating posts 6 being thus held at two points remain practically in an upright position. At the top the floating trolley posts 6 are connected by a stout wire cable 13 which keeps them steady in the direction of the trolleyway. Near the top the posts 6 carry the cross beams 5 to support the electric conductors 3 and 4 which serve to convey electric current to motors carried by traveling floating cars.

The conductors 3 and 4 are made of metal rolled in a shape of cross section, best shown in Figs. 3 and 5, being rounded up on top and bottom at 14, and having at the sides the grooves 15—15 to receive the engaging ends 16 of the clamps 17, whereby they become secured to the cross beams 5 as shown in Fig. 5, and the grooves 18—18 forming channels for the trolley contact wheels 19 shown in Fig. 3.

For guiding the floating cars along the course of travel, short beams 20 are secured to the posts 6 and are provided with the clamps 21 which are of the same form as the clamps 17 shown in Fig. 5, and which serve to hold the guiding trolley rails 22. The said trolley rails are of a similar cross section as the conductors 3 and 4 having the grooves 15 to receive the engaging ends of the clamps 21, and the grooves 18 to engage the guiding wheels 23 carried by the guiding arm 24 pivotally secured to the side of the car body 25. Fig. 10 is a perspective of a portion of the trolleyway illustrating the manner in which the overhead conductors 3 and 4 and the guiding rails 22 are arranged upon the trolley posts.

The car body 25 is mounted upon two floats 26 which are preferably made of an oblong shape, pointed and properly curved in the front so as to offer little resistance while being moved through the water. The floats are placed some distance apart running parallel to one another, and are provided with propellers 27 which are arranged to be driven by electric motors (not shown) receiving current from the overhead conductors 3 and 4. Rudders 28 for steering are placed behind the propellers and are connected so as to be operated together.

A trolley pole 29 pivoted on the top of the car in the same manner as the trolley poles of the ordinary street cars, is furnished at the free end with the contact wheels 19 engaging the grooves 18 in the overhead conductors 3 and 4 and with the additional wheel 30 running in contact with the same conductors at the bottom as shown in detail in Fig. 3. The trolley pole thus forms a positive connection between the overhead conductor and the car.

The car body mounted upon the floats 26 and carrying the trolley pole 29 connecting it with the overhead conductor has the appearance of an ordinary electric street car, moving over the surface of the water as shown in Figs. 6 and 7.

The interior of the car is furnished with seats for the convenience of the passengers and is illuminated at night by electric lights receiving current from the overhead conductors 3 and 4.

The posts 6 carry on top the electric lamps 31 which receive current from the same conductors.

Figs. 8 and 9 illustrate a modification in the manner of securing the contact wheels 19 to the free end of the trolley pole 29. Here the contact wheels 19 are four in number and are arranged in two pairs on a carriage 32 engaging the grooves 18 of the conductors 3 and 4 from the opposite direction, while the additional contact wheel 30 engages the conductor at the bottom. The trolley pole 29 is pivoted to the carriage 32 by means of the pin 33. The trolley pole 29 being thus pivoted at the two ends permits the up and down motion of the car body in rough weather, without disturbing to a considerable extent the overhead conductors 3 and 4. For the convenience of taking on or letting off passengers, a landing place is constructed near the shore as shown in Fig. 1. The landing place consists of the piers 34 running in a direction at right angles to the shore; stairs 35 pivoted at the top to the said piers lead down to the floating platforms 36 and 37 arranged one on each side of the side 1 of the trolleyway. Beyond the floating platform 36 is built a breakwater 38 which extends for some distance beyond the two ends of the floating platforms, preventing the waves from reaching the latter.

The floating platforms 36 and 37 may be provided with the landing aprons 39 which may be lowered when taking on or letting off passengers, and raised up again when the car is ready to move.

To facilitate the stopping of the floating car, a brake 40 is placed beneath the car body between the two floats, 26, which is adapted to be swung downward entering deep into the water and offering a great resistance to the motion of the car (as shown in Fig. 7 and at the right in Fig. 2) or to be swung upward out of the water as shown at the left in Fig. 2, when the car is in motion.

Having thus described my invention, what I claim as new and desire to secure by Letters Patent is:

1. In a device of the character described floating posts, buoyant bodies carried by said posts at about their middle, a number of anchors secured to the sea bottom some distance apart, means for securing said buoyant bodies to said anchors, means for fastening the bottom ends of said floating posts to the same anchors, one or more overhead electric conductors suspended from the said floating posts and a floating car provided with an electric motor and furnished with a trolley pole engaging the said overhead conductor and conveying electric current to said motor.

2. In a device of the character described floating posts, buoyant bodies carried by said posts at about the middle, a number of anchors secured to the sea bottom some distance apart, means for securing the said buoyant bodies and the bottom ends of the said floating posts to the said anchors, a cable connecting the top ends of the said floating posts together, one or more electric conductors suspended from the said floating posts, and a floating car carrying an electric motor and furnished with a trolley pole engaging the said overhead conductor and conveying an electric current to said motor.

3. In a device of the character described floating posts, buoyant bodies carried by said posts at about their middle, means for anchoring the said buoyant bodies and the bottom ends of said posts to the sea bottom, one or more electric conductors suspended from the said floating posts, one or more guiding rails connecting the said floating posts, a floating car driven by an electric motor receiving current from the said conductor and one or more guiding arms pivoted to the said floating car at one end, engaging the said guiding rails at the other end.

4. In a machine of the character described the combination of floating posts anchored to the sea bottom and carrying overhead electric conductors, a car body mounted upon floats and fitted with seats for passengers, an electric motor, receiving current from said electric conductors, carried by said car, and a landing place at the shore, comprising a pier, a floating platform, stairs hinged at one end from said pier and resting with the other end upon said floating platform and a breakwater built some distance from the shore beyond the floating platform extending in length beyond the two ends of the latter.

5. In a device of the character described floating posts, buoyant bodies carried by said posts at about their middle, means for anchoring the said buoyant bodies and the bottom ends of said posts to the sea bottom, one or more electric conductors, clamps for suspending the said conductors from said floating posts, a car provided with an electric motor and furnished with a trolley pole, the said electric conductors being of an oblong cross section having on the oblong sides two opposite grooves, receiving the engaging ends of said clamps and two other grooves to engage electric contact wheels carried by the said trolley pole.

6. In a device of the character described floating posts, buoyant bodies carried by said posts at about their middle, means for anchoring the said buoyant bodies and the bottom ends of said posts to the sea bottom, one or more electric conductors suspended from said floating posts, one or more guiding rails connecting the said floating posts, clamps for securing the said guiding rails to the said posts, a floating car driven by an electric motor receiving current from the said conductor and one or more guiding arms pivoted to the said floating car, the said guiding rails being of an oblong cross section having on the oblong sides two opposite grooves receiving the engaging ends of said clamps and two other grooves to engage guiding wheels carried by the said guiding arm.

7. In a device of the character described the combination of floating posts, buoyant bodies carried by said posts at about their middle, means for anchoring the said buoyant bodies and the bottom ends of said posts to the sea bottom, one or more electric conductors suspended from said floating posts, one or more guiding rails connecting the said floating posts, a car mounted upon floats carrying propellers driven by an electric motor receiving current from said conductors, steering devices carried by said floats comprising rudders for controlling the rear of the floats and guiding arms carried by said car engaging guiding rails carried by said floating posts.

8. In a device of the character described the combination of floating posts, buoyant bodies carried by said posts at about their middle, means for anchoring the said buoyant bodies and the bottom ends of said posts to the sea bottom, a car mounted upon floats carrying propellers driven by an electric motor receiving current from said conductors and a brake comprising a plate placed beneath the car body between the floats and hinged at one end to the bottom of the car, the other end being adapted to be swung down so as to be lowered into the water or to be raised upward so as to remain above the surface of the water.

STEVEN C. MENIER.

Witnesses:
M. B. Pratt,
Fannie Levi.

Copies of this patent may be obtained for five cents each, by addressing the "Commissioner of Patents, Washington, D. C."